United States Patent [19]

Miyata et al.

[11] 4,324,144

[45] Apr. 13, 1982

[54] TURBINE FLOWMETER

[75] Inventors: Yasuji Miyata, Yokohama; Kazuhiko Hirose, Mitaka, both of Japan

[73] Assignee: Tokico, Ltd., Kanagawa, Japan

[21] Appl. No.: 798

[22] Filed: Jan. 3, 1979

[30] Foreign Application Priority Data

Jan. 20, 1978 [JP] Japan .................................. 53-4851

[51] Int. Cl.³ ............................................... G01F 1/10
[52] U.S. Cl. .................................................. 73/861.77
[58] Field of Search ............ 73/229, 231 R; 324/166; 361/285

[56] References Cited

U.S. PATENT DOCUMENTS

| | | | |
|---|---|---|---|
| 2,455,345 | 11/1948 | Watt | 324/166 |
| 2,723,562 | 11/1955 | Lutz et al. | 73/231 |
| 3,208,269 | 9/1965 | Eccles et al. | 73/231 X |
| 3,377,556 | 4/1968 | Corcoran | 324/166 |
| 4,164,866 | 8/1979 | Mitchell | 73/231 |

FOREIGN PATENT DOCUMENTS

| | | | |
|---|---|---|---|
| 498126 | 9/1934 | Italy | 324/166 |
| 606278 | 8/1948 | United Kingdom | 73/231 |

*Primary Examiner*—Herbert Goldstein
*Attorney, Agent, or Firm*—Wegner & Bretschneider

[57] ABSTRACT

This invention relates to a turbine flowmeter comprising an impeller with blades rotatably mounted in a casing and a detection means provided to detect the revolutions of said impeller as a change of electrostatic capacity.

9 Claims, 7 Drawing Figures

TURBINE FLOWMETER

This invention relates to a turbine flowmeter for measuring the flow rate or flow velocity of a fluid.

In the known types of turbine flowmeter, the revolutions of the impeller corresponding to the flowing velocity of the fluid to be measured is electromagnetically detected as a change of induced electromotive force or inductance and the flow rate or velocity of the fluid is measured from the detection signal. There are known some means for detecting the impeller revolutions, and in one example thereof, a permanent magnet is embedded in each blade of the impeller while a pickup coil is provided in the casing so that the revolutions of the impeller are detected by the pickup coil as a change of induced electromotive force based on passage of the flux. In another example of said means, a magnetic material is used for the impeller blades and a pickup coil mounted with a permanent magnet is provided in the casing so that the impeller revolutions are detected by the pickup coil as a change of induced electromotive force based on the change of magnetic resistance. In still another example, an electroconductive or magnetic material is used for the impeller blades and a pickup coil is provided on the casing side so as to constitute an oscillator with said coil, a separately provided capacitor and other active elements such as transistors, whereby when a blade passes near the coil, the coil inductance is changed and the signal issued from the oscillator undergoes an amplitude modulation and this amplitude-modulated signal is demodulated to detect the impeller revolutions.

However, in any of these known detection means where a coil and a permanent magnet(s) are used as essential elements, there is a possibility that when these elements are exposed to a high temperature, the insulating coating of the coil might be fused to disable the coil from performing its normal function. This might also affect the magnetic force of the permanent magnet to cause a reduction of the detecting output. Thus, the conventional turbine flowmeters involve difficulties in measuring the fluids of high temperatures and unfitness for the use in a high temperature atmosphere so that both the measurable fluid temperature range and the environment or atmosphere where the device is used are limited. The conventional devices also had the problem of enlarged overall size because they required a coil of multiple turns, a core therefor and other associated elements.

In these devices, there is still another defect such as lowered accuracy in measurement resulting from the resonance of an oscillating coil and a receiving coil with noise from outside.

An object of this invention is to provide a turbine flowmeter that can be used for the fluids of high temperatures.

Another object of this invention is to provide a turbine flowmeter that can be properly used even in a high-temperature atmosphere.

Still another object of this invention is to provide a turbine flowmeter that can be designed into a compact form.

Yet another object of this invention is to provide a turbine flowmeter which allows to obtain a favorable level of the signal to noise ratio in the detected signal obtained under the electromagnetic noise from the outside, consequently allows accurate measurement of flow rate and velocity of a fluid even under the circumstances full of noise, and also allows simplification of the mechanism of the whole detection system.

Further another object of this invention is to provide a turbine flowmeter whereby the detection system is controlled to obtain the detected signal based on where the blade of the impeller is positioned, so as to allow to obtain the detected signal of the sufficient value under the low revolution of the impeller.

In order to accomplish the said objects, there is provided according to this invention a turbine flowmeter comprising an impeller with blades rotatably supported in a casing, and a detection means adapted to detect the revolutions of said impeller as a change of electrostatic capacity.

In a preferred embodiment of this invention, the detection means may be constituted from an electrode provided in the casing and the impeller, and in another preferred embodiment, said detection means may be constituted from a pair of electrodes provided in the casing.

The electrode adapted to constitute a capacitor together with the impeller may be provided in opposition to any one of the blades of the impeller, while when a pair of electrodes are provided, such electrodes may be disposed in opposition to any one of the blades and spaced-apart suitably from each other.

Preferably, said electrode is provided at the location of a groove which is formed in the inner face of the casing in the direction of rotation of the impeller, and the end of the blade is positioned in said groove.

The invention is now described in detail by way of the preferred embodiments thereof in conformity to the accompanying drawings. The above-said and other objects and features of this invention will become more apparent from such description. It is to be understood, however, that this invention is not limited to these embodiments but various other changes and modifications can be made within the principle of the invention, and all of these changes and modifications are embraced within the scope of this invention.

Figure 1:
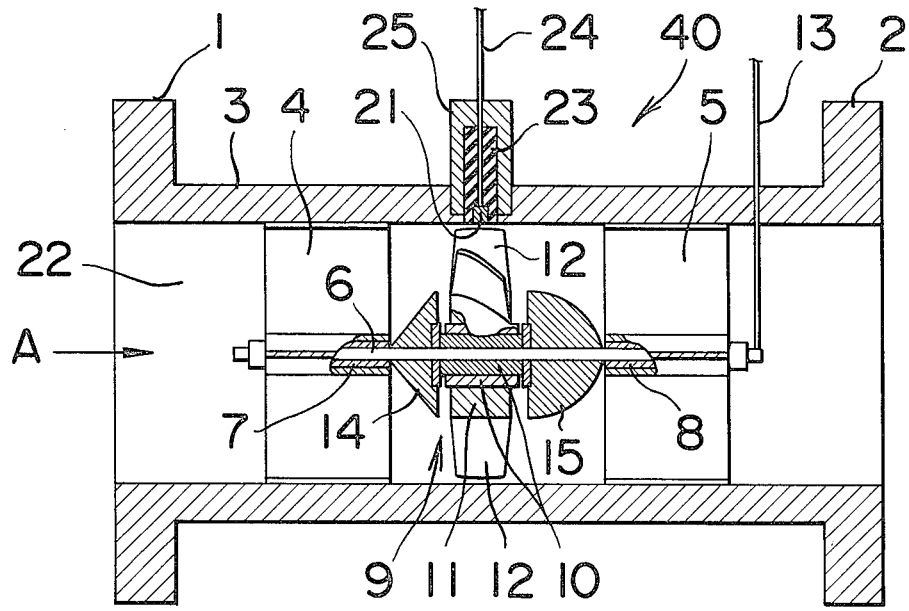
FIG. 1 is a longitudinal sectional view of one preferred embodiment of this invention.
Figure 2:
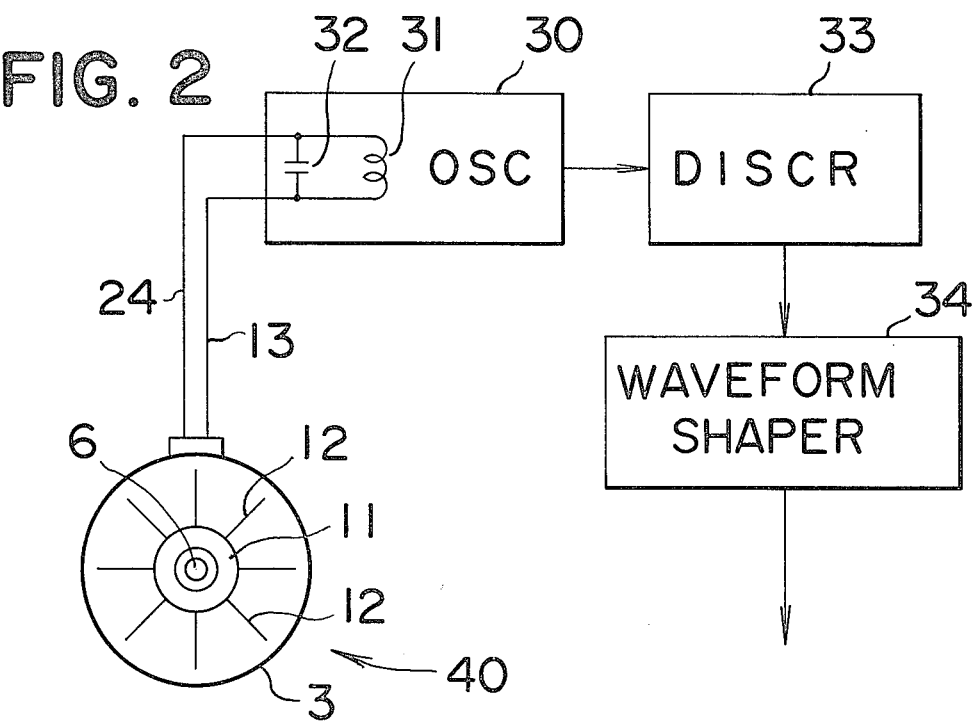
FIG. 2 is a block diagram illustrating a detection system adapted to the turbine flowmeter according to this invention.

Referring first to FIGS. 1 and 2 illustrating a preferred embodiment of this invention, it will be seen that a pair of flanges 1, 2 are provided at both ends of a cylindrical casing 3 which has fitted therein a pair of supporting plates 4, 5 disposed with a predetermined spacing therebetween, and a shaft 6 is supported at its both ends by said supporting plates 4, 5 through a cylindrical insulating member 7, 8 so that said shaft 6 is properly set relative to the casing 3. Also provided in the casing 3 is an impeller 9 made of an electroconductive material and comprising a cylindrical rotator 11 rotatably mounted on the shaft 6 through a bearing 10 and a plural number of blades 12 planted on said rotator 11. Said both bearing 10 and shaft 6 are also made of an electroconductive material, and a lead wire 13 extends out from an end of said electroconductive shaft 6. The impeller 9 and its associated elements are electrically insulated from the casing 3 by the members 7, 8, so that each electroconductive blade 12 can serve as a counterpart electrode. There are also provided the fluid guide members 14, 15 supported by the shaft 6 and disposed on the upstream side and downstream side, respectively, of the impeller 9 so as to guide the fluid flowing in the direction of arrow A. A detection electrode 21 made of an electroconductive material is provided in the inner face of the casing 3 such that one face of said electrode is exposed in opposition to the end of a blade 12, without projecting into the fluid passage 22 defined by the casing 3. Said detection electrode 21 is embedded in an insulating member 23 secured to the casing 3 so that said electrode 21 is electrically insulated against the casing 3. Said electrode 21 may be either plate-shaped or formed conical. The insulating member 23 is preferably made of a material with a small thermal expansion coefficient, such as quartz, for minimizing the effect of thermal expansion at high temperatures. A lead wire 24 connected to the detection electrode 21 extends out through the insulating member 23 and a cap 25. The cap 25 is secured to the casing 3 and sheathes the insulating member 23 to protect it.

The lead wires 13, 24 are connected to an oscillation circuit 30 designed to oscillate at a frequency which is determined by the inductance of a coil 31 provided therein, electrostatic capacity of a capacitor 32 also provided therein and electrostatic capacity between the electrode 21 and impeller 9. The variable capacitor constituted from the electrode 21 and impeller 9 is connected in parallel to the capacitor 32 through the lead wires 13, 24.

The fluid to be measured flows in the direction of arrow A and accordingly the impeller 9 revolves so that the blades 12 successively pass in front of the detection electrode 21, with the distance between the electrode 21 and each blade 12 varying correspondingly. When a blade 12 approaches the electrode 21, the electrostatic capacity therebetween increases, and when said blade moves away from the electrode 21, the electrostatic capacity therebetween decreases. Such change of electrostatic capacity is given to the oscillation circuit 30, on one hand through the lead Zire 24 and on the other hand through the rotator 11, bearing 10 and lead wire 13, and the oscillation circuit 30 issues a signal which has been frequency-modulated according to the change of electrostatic capacity supplied. The frequency-modulated oscillation signal from the oscillation circuit 30 is sent to a frequency discriminator 33 where the signal is demodulated and the change of frequency is converted into a corresponding change of amplitude. The signal with varying voltage from the discriminator 33 is sent to a shaping circuit 34 and shaped in waveform, whereby the pulse voltage signals proportional to the number of the blades 12 which have passed the detection electrode 21 are issued from the shaping circuit, and such signals are counted by a counter to determine the number of revolutions of the impeller, that is, the flow rate of the fluid. The oscillation circuit 30, frequency discriminator 33 and shaping circuit 34 are of the known type, and hence no detailed explanation is here given on such elements. The electric insulation against the casing 3 may be provided on one side alone, if so required.

In case the turbine flowmeter 40 is used for a fluid of high temperature or set in a high-temperature atmosphere, the inside of the cap 25 is heated just like other parts, but since no coil, permanent magnet or such is incorporated in the mechanism in the cap 25 but merely an electrode 21 is provided, the internal mechanism suffers no impediment and works normally even under high temperatures. Break of the cap 25 may be considered as a result of expansion of the insulating member 23 when exposed to a high temperature. However, according to this invention, since a material with a small thermal expansion coefficient such as quartz is used for the insulating member 23, no large force is exerted to the cap 25 and hence there occurs substantially no trouble such as rupture of the cap 25 in use under a high temperature condition. Needless to say, the capacitor constituted from the electrode 21 and impeller 9 can operate normally in the low-temperature circumstances as in the conventional devices.

Thus, the above-described turbine flowmeter 40 according to this invention is usable for the measurement of not only the fluids of low temperatures but also the fluids of high temperatures and can be also safely set in a high-temperature atmosphere for proper use thereof.

Figure 3:
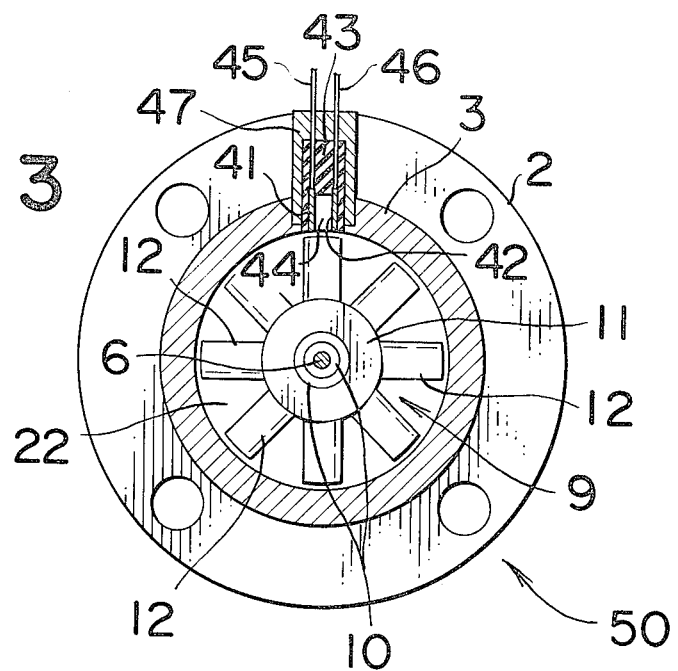
FIG. 3 is a sectional view taken along a plane vertical to the longitudinal axis in another preferred embodiment of this invention.
Figure 4:
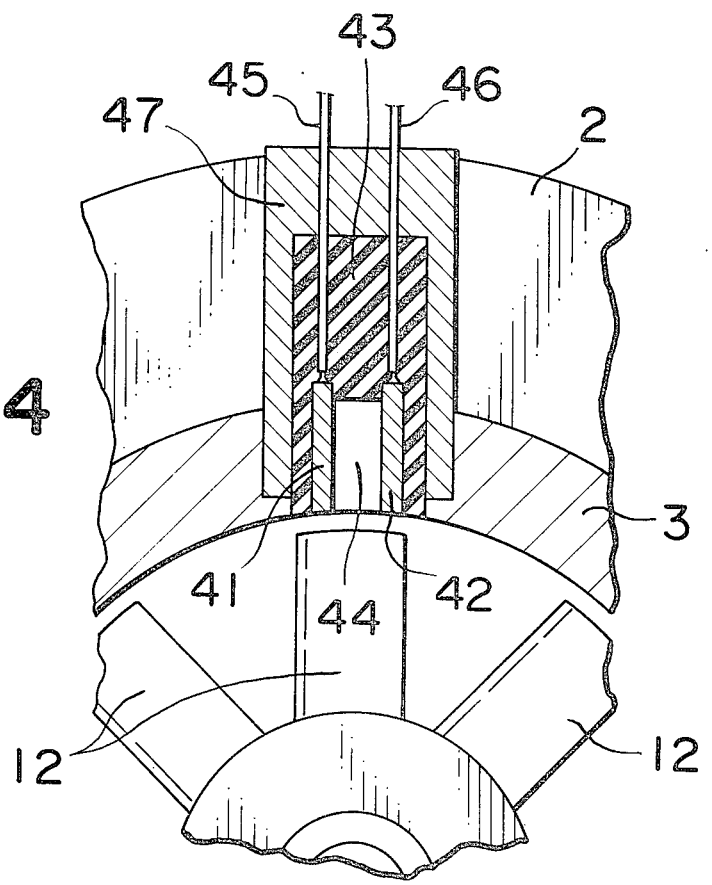
FIG. 4 is a detailed illustration of an electrode and other associated elements in the embodiment of FIG. 3.

Referring now to FIGS. 3 and 4, there is illustrated another preferred embodiment of this invention. It will be noted that the same reference numerals are used to indicate the same parts as in the preceding embodiment.

In the embodiment of FIGS. 3 and 4, there are provided a pair of plate detection electrodes 41 and 42 in the casing 3 in opposition to the foremost end of a blade 12. These detection electrodes 41, 42 are secured to an insulating member 43 made of quartz or the like in a recession 44 opening to the fluid passage 22 and are disposed in opposed relation while spaced-apart from each other by a predetermined distance in the direction of revolution of the impeller 9. Each of said electric-conductive detection electrodes 41, 42 is exposed at its one end to the fluid passage 22 at the inner surface of the casing 3 without projecting into the interior of the casing 3 and embedded at its other end into the insulating member 43. Connected to said respective electrodes 41, 42 are the lead wires 45, 46 which extend out through the insulating member 43 and cap 47 while insulated from each other. The insulating member 43 is secured in a predetermined position in a way such that it is protected by the cap 47. Electric insulation of the impeller 9 against the casing 3 may not be required.

The detection electrodes 41 and 42 constitute a capacitor through the medium of the fluid which enters the recession 44. As the impeller 9 revolves in accordance with the flow of the fluid to be measured, each blade 12 passes a position closely proximate to the electrodes 41, 42, and because each blade 12 is made of a material with different dielectric constant from that of the fluid to be measured, the dielectric constant between the detection electrodes 41 and 42 varies upon passage of each blade 12 through the said position opposed to the electrodes 41, 42 causing a corresponding change of electrostatic capacity therebetween, and such change is picked up through the lead wires 45, 46. This detection output is changed into the electric pulse signals through the oscillation circuit 30, frequency discriminator 33 and shaping circuit 34 as in the preceding embodiment, and such pulse signals are counted to determine the flow rate of the fluid.

Because of non-use of coil and other like elements, the thus constructed turbine flowmeter 50, just like the flowmeter 40 of the preceding embodiment, can stand use under high temperatures and can be also constructed into a compact form, and thus such flowmeter is capable of measuring the fluid of a high temperature and can be safely used in a high-temperature atmosphere.

Further, preferably the blades can be made of chemically inactive member, for example, anticorrosive members.

Figure 5:
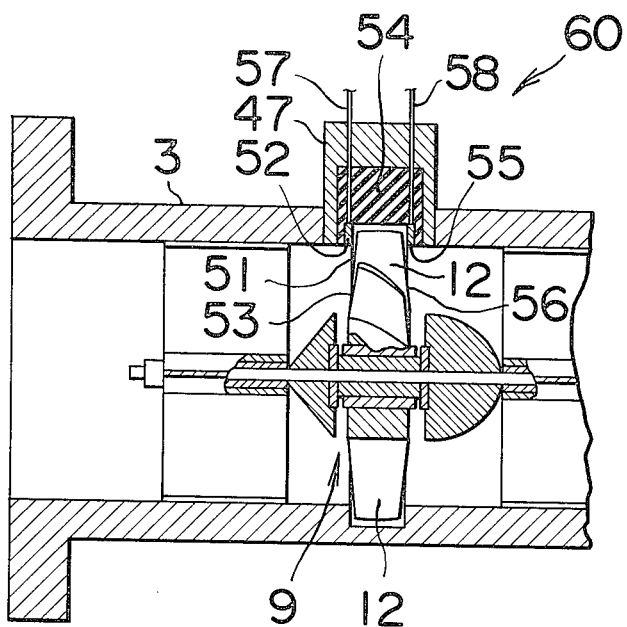
FIG. 5 is a diagrammatic illustration of still another preferred embodiment of this invention.

In still another embodiment shown in FIG. 5, a groove 51 is formed in the inner face of the casing 3 in the direction of revolution of the impeller 9. The width of this groove 51 is slightly greater than the width of the free end portion of the blade 12 so that the end of the blade 12 is positioned in said groove 51. A plate-shaped electroconductive electrode 52 is provided at a suitable location in the peripheral direction of the groove 51, said electrode 52 being secured to an insulating member 54 with one side of said electrode being opposed to the front edge 53 of the blade 12. Another electrode 55 adapted to constitute a capacitor with said electrode 52 is similarly secured to the insulating member 54 with one side of said electrode 55 being opposed to the rear edge 56 of the blade 12. Thus, if arrangement is made such that the end of each blade 12 is positioned between a pair of detection electrodes 52, 55 as in the turbine flowmeter 60 of this embodiment, it is possible to increase the change of electrostatic capacity obtained through the lead wires 57, 58 with the rotation of the impeller 9 and to obtain a frequency-modulated signal with a large degree of modulation, thus allowing normal use of the flowmeter even in the circumstances full of noise.

Figure 6:
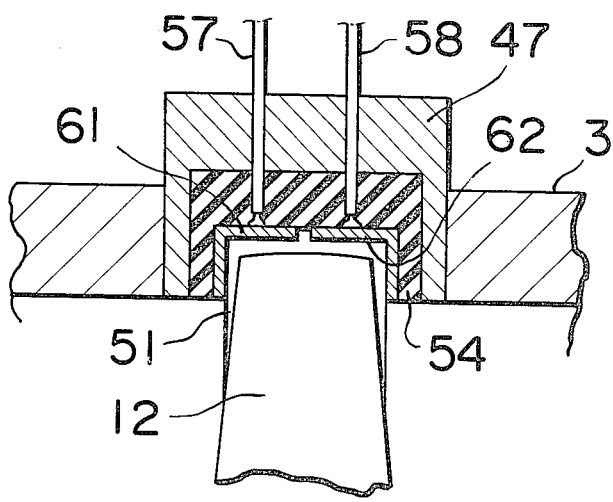
FIG. 6 is a schematic illustration of another embodiment of the electrode adapted in the embodiment of FIG. 5.
Figure 7:
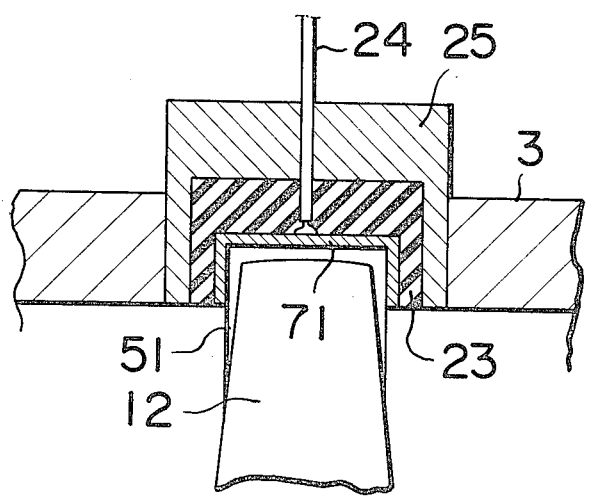
FIG. 7 shows still another preferred example of the electrode as employed in case a groove is provided in the casing in the embodiment of FIG. 1.

The electrodes 52, 55 may be so designed as to have an L-shaped sectional from in conformity to the sectional shape of the groove 51 as shown in FIG. 6. Use of such L-sectioned detection electrodes 61, 62 allows obtainment of even better S/N detection signals. In case the electrodes are adapted to constitute a capacitor in cooperation with the impeller 9, the electrode 71 provided on the casing 3 side may be U-shaped in section in conformity to the sectional shape of the groove 51 as shown in FIG. 7.

What is claimed is:
1. A turbine flowmeter comprising
(a) cylindrical casing,
(b) a passage defined by an inner space of the casing for conducting a fluid to be measured,
(c) an impeller rotatably supported within the casing in the passage, said impeller having a rotator with a number of blades fixed on the outer surface of the rotator,
(d) guide members for guiding the fluid in the passage and disposed on the upstream side and downstream side of the impeller, respectively,
(e) an annular recess provided within the casing adjacent to the free end of a blade in the direction of rotation of the impeller, the free end portion of the blade being positioned in the annular recess, and
(f) a pair of electrode plates for detecting the rotation of the impeller as a change of electrostatic capacity, said electrode plates being fixed in the recess of the casing without projecting into the passage and being disposed in opposition to each other at a distance.

2. A turbine flowmeter as claimed in claim 1, wherein said electrode plates are so disposed that one of the plates is close to the front edge of the blade while the other plate is close to the rear edge of the blade.

3. A turbine flowmeter as claimed in any one of claim 1, or 2, wherein the electrode plates are electrically insulated by quartz from each other.

4. A turbine flowmeter comprising an impeller rotatably supported in a casing and provided with blades, and a detection means adapted to detect the revolutions of the impeller as a change of electrostatic capacity, wherein, in order to improve the signal to noise ratio in the detected signal, said detection means comprises a first electrode plate fixed on the casing at the location of a groove formed in the inner face of the casing in the direction of rotation of the impeller, and a second electrode provided in the casing adjacently to said first electrode plate and spaced therefrom, the free end portion of each of the blades being positioned in said groove.

5. A turbine flowmeter as claimed in claim 4, wherein said second electrode comprises said blade.

6. A turbine flowmeter as claimed in claim 5, wherein the first electrode plate is configured correspondingly to the sectional shape of the groove.

7. A turbine flowmeter as claimed in claim 6, wherein the first electrode plate is U-shaped in section.

8. A turbine flowmeter as claimed in claim 4, wherein said second electrode comprises a second electrode plate fixed on the casing at the location of said groove, said free end portion of each of the blades being positioned between said electrode plates.

9. A turbine flowmeter as claimed in claim 8, wherein said electrode plates are so arranged that one of said electrode plates is close to the front edge of the blade while the other electrode plate is close to the rear edge of the blade.

* * * * *